United States Patent
Parkinson

(10) Patent No.: US 8,850,208 B1
(45) Date of Patent: Sep. 30, 2014

(54) CERTIFICATE CROSSCHECKING BY MULTIPLE CERTIFICATE AUTHORITIES

(75) Inventor: Sean F. Parkinson, Indooroopilly (AU)

(73) Assignee: EMC Corporation, Hopkinton, MA (US)

(*) Notice: Subject to any disclaimer, the term of this patent is extended or adjusted under 35 U.S.C. 154(b) by 717 days.

(21) Appl. No.: 13/168,163

(22) Filed: Jun. 24, 2011

(51) Int. Cl.
*H04L 9/32* (2006.01)
*H04N 21/835* (2011.01)

(52) U.S. Cl.
CPC ............ *H04N 21/835* (2013.01); *H04L 9/3263* (2013.01)
USPC ........... 713/175; 713/178; 713/188; 713/155; 726/2; 726/10; 709/225; 709/229

(58) Field of Classification Search
CPC ...... H04N 21/835; H04L 9/3263; H04L 9/32; G06F 21/33; G06F 21/64
USPC ........ 713/175, 178, 188, 155, 200; 726/2, 10; 709/225, 229
See application file for complete search history.

(56) References Cited

U.S. PATENT DOCUMENTS

| | | | |
|---|---|---|---|
| 6,928,550 B1* | 8/2005 | Le Pennec et al. | 726/1 |
| 7,055,175 B1* | 5/2006 | Le Pennec et al. | 726/24 |
| 7,209,563 B1* | 4/2007 | Calvez et al. | 380/278 |
| 7,359,507 B2 | 4/2008 | Kaliski | |
| 7,383,434 B2* | 6/2008 | Wildish et al. | 713/157 |
| 7,418,597 B2* | 8/2008 | Thornton et al. | 713/175 |
| 7,716,484 B1 | 5/2010 | Kaliski, Jr. | |
| 8,176,336 B1 | 5/2012 | Mao et al. | |
| 8,261,336 B2 | 9/2012 | Gasparini et al. | |
| 8,578,466 B2* | 11/2013 | Imai | 726/10 |
| 2002/0073308 A1* | 6/2002 | Benantar | 713/155 |
| 2011/0004753 A1* | 1/2011 | Gomi et al. | 713/156 |
| 2012/0234908 A1* | 9/2012 | Wang et al. | 235/375 |
| 2014/0008429 A1* | 1/2014 | Wang et al. | 235/375 |

OTHER PUBLICATIONS

Google Patent Search.*
ACM search.*
IEEE search.*
IP.com search.*
Parkinson, Sean, "Rethinking PKI", https://community.emc.com/community/edn/rsashare/blog/2011/03/30rethinking-pki., p. 1.
Rashid, Fahmida Y., "Comodo's SSL Certification Attack Only One Step in a Larger Attack", IT Security & Network Security News, eWeek.com, http://www.eweek.com/c/a/Security/Comodos-SSL-Certification-Attack-Only-One-Step-In-A-Larger-Attack., Jun. 1, 2013, pp. 1-3.

(Continued)

*Primary Examiner* — Arvin Eskandarnia
(74) *Attorney, Agent, or Firm* — BainwoodHuang

(57) ABSTRACT

Embodiments relate to a method for generating a set of authentication certificates by a set of certificate authority devices. The method includes receiving, by the set of certificate authority devices, a set of certificate requests from a user device. The method includes generating, by the set of certificate authority devices, a set of crosschecked certificates, each crosschecked certificate of the set of crosschecked certificates being configured to cryptographically verify the remaining crosschecked certificate of the set of crosschecked certificates. The method includes transmitting, by the set of certificate authority devices, the set of crosschecked certificates to the user device, the set of crosschecked certificates configured to be utilized by the user device in establishing a secured communication channel over a network between the user device and a client device.

14 Claims, 4 Drawing Sheets

(56) References Cited

OTHER PUBLICATIONS

Bright, Peter, "How the Comodo Certificate Fraud Calls CA Trust Into Question", http:arstechnica.com/security/news/2011/03/how-the-comodo-certificate-fraud-calls-ca-trust-into-question., Jun. 1, 2011, pp. 1-3.

Bright, Peter, "How the Comodo Certificate Fraud Calls CA Trust Into Question", http:arstechnica.com/security/news/2011/03/how-the-comodo-certificate-fraud-calls-ca-trust-into-question., Jun. 1, 2011, pp. 1-4.

\* cited by examiner

CERTIFICATE CROSSCHECKING BY MULTIPLE CERTIFICATE AUTHORITIES

BACKGROUND

A typical corporate organization, such as a bank or on-line retailer, utilizes the Internet to communicate with customers and vendors, to conduct research, and to perform various other tasks. For example, as part of the usual course of business, the organization can exchange proprietary information, such as financial, credit card or account information, with a client or client device. However, theft of proprietary information is one of the most costly security problems facing organizations today. For example, theft of financial data, customer lists, and intellectual property can impact revenues, increase legal costs, and erode long-term competitive advantages for an organization.

To minimize access to proprietary information exchanged between an organization and a client device over a network, the organization can typically establish a secured communication channel, such as a Transport Layer Security (TLS) or a Secure Sockets Layer (SSL) communication channel with the client device. In conventional systems, public and private keys, in combination with Public Key Infrastructure (PKI) certificates, can be utilized to establish a secured communication channel between the organization and the client device. For example, the usage of PKI in TLS results in the establishment of a shared secret that is used by the organization and the client device when encrypting and decrypting the proprietary information. Additionally, the use of a public-private key pair is used to prove the identity of one party, either the organization or the client device. A party's identity can be proven by signing using the public-private key pair and checked through verification. Conventionally, only the organization server will have the key pair, however the client device can as well. Accordingly, when either the organization server or the client device a person signs an electronic record with their corresponding private key, such a signature generates a digital signature code that the receiving organization server or client device can verify using the public key.

In use, in response to a request to establish a secured communications channel from the client device, the organization server transmits, to the requesting client device, a certificate that includes public key that has been signed by a trusted third party, known as a certificate authority. The certificate authority holds a trusted position because the certificate that it issues verifies the identity of the organization server. Accordingly, once the client device has checked the certificate to make sure that it comes from a trusted certificate authority, the client device can utilize its private key and the shared public key to securely communicate with the organization via the organization server.

SUMMARY

Establishment of conventional secured communication channels between organizations and client devices can suffer from a variety of deficiencies. For example, in certain situations, a certificate authority can be fraudulently accessed (e.g., hacked) and subsequently compromised by an unauthorized user. In such a case, under the direction of the unauthorized user, the compromised certificate authority can be configured to issue valid but fraudulent certificates to requesting organizations, such as banks or other institutions, which then pass the certificates on to associated client devices. The fraudulent certificates would appear to the client device as verifying the identity of the organization by a trusted certificate authority. However, in such a case, the fraudulent certificates allow the unauthorized user to impersonate the organization's server in the secured connection and allow the unauthorized user to perform Man-In-The-Middle (MITM) attacks on the secured communications logins between the client device and the organization's server. For example, in a MITM attack, while the client device believes that it is transmitting proprietary information, such as bank account or credit card information, to a trusted organization server, the unauthorized user would effectively eavesdrop on the transmission, collect the proprietary information and pass all or some of the information back to the organization's server.

By contrast to conventional certificate generation by a certificate authority, embodiments of the innovation relate to generation of certificates by multiple certificate authorities and certificate crosschecking. In one arrangement, a certificate authority system includes two distinct certificate authorities configured to issue crosschecked authentication certificates. In use, a certificate requestor, such as an organization device, explicitly contacts each of the certificate authorities with a corresponding certificate request to request a set of crosschecked certificates (i.e., two certificates that cryptographically verify each other). As part of the certificate requests, the certificate requestor includes identification details of both certificate authorities which allow the certificate authorities to work with each other to generate the crosschecked certificates. Each of the resulting crosschecked certificates includes an extension that contains certificate identifying information and a signature of the checked certificate's contents.

The use of crosschecked certificates in the establishment of a secured communication channel between an organization device and a client device minimizes the likelihood of a malicious attacker creating a fraudulent certificate and infiltrating the secured channel, such as can occur when a single certificate authority generates an authentication certificate. For example, in a handshake procedure between the organization device and the client device, the certificate requestor sends both crosschecked certificates to the client device. If the malicious attacker replaces one of the crosschecked certificates with a fraudulent certificate, during a validation process the client device can detect the absence or invalidity of an extension, as is typically included in a properly issued crosschecked certificate. With such detection, the client device can detect the possible intrusion by the malicious attacker and can shut down the establishment of the secure communications channel with the organization device.

Additionally, the certificate authority system minimizes the ability for a malicious attacker to replicate the pair of crosschecked certificates utilized in the establishment of a secured communication channel. For the malicious attacker to replace both certificates, the attacker would have to successfully compromise both of the distinct certificate authorities at the same time and coordinate the generation of each extension included in the crosschecked certificates. Such an attack scenario is very complicated and, as a result, unlikely.

In one arrangement, embodiments of the innovation relate to a method for generating a set of authentication certificates by a set of certificate authority devices. The method includes receiving, by the set of certificate authority devices, a set of certificate requests from a user device. The method includes generating, by the set of certificate authority devices, a set of crosschecked certificates, each crosschecked certificate of the set of crosschecked certificates being configured to cryptographically verify the remaining crosschecked certificate of the set of crosschecked certificates. The method includes transmitting, by the set of certificate authority devices, the set of crosschecked certificates to the user device, the set of crosschecked certificates configured to be utilized by the user device in establishing a secured communication channel over a network between the user device and a client device.

In one arrangement, embodiments of the innovation relate to a method for providing a set of crosschecked authentication certificates to a client device. The method includes transmitting, by a user device and at substantially the same time, a first certificate request to a first certificate authority device of a set of certificate authority devices and a second certificate request to a second certificate authority device of the set of certificate authority devices. The method includes receiving, by the user device, a first crosschecked certificate from the first certificate authority device and a second crosschecked certificate from the second certificate authority device. The method includes verifying, by the user device, at least one of the first crosschecked certificate and the second crosschecked certificate. The method includes transmitting, by the user device, the first cross-checked certificate and the second crosschecked certificate to the client device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the innovation relate to generation of certificates by multiple certificate authorities and certificate crosschecking. In one arrangement, a certificate authority system includes two distinct certificate authorities configured to issue crosschecked authentication certificates. In use, a certificate requestor, such as an organization device, explicitly contacts each of the certificate authorities with a corresponding certificate request to request a set of crosschecked certificates (i.e., two certificates that cryptographically verify each other). As part of the certificate requests, the certificate requestor includes identification details of both certificate authorities which allow the certificate authorities to work with each other to generate the crosschecked certificates. Each of the resulting crosschecked certificates includes an extension that contains certificate identifying information and a signature of the checked certificate's contents.

The use of crosschecked certificates in the establishment of a secured communication channel between an organization device and a client device minimizes the likelihood of a malicious attacker creating a fraudulent certificate and infiltrating the secured channel, such as can occur when a single certificate authority generates an authentication certificate.

For example, in a handshake procedure between the organization device and the client device, the certificate requestor sends both crosschecked certificates to the client device. If the malicious attacker replaces one of the crosschecked certificates with a fraudulent certificate, during a validation process the client device can detect the absence or invalidity of an extension, as is typically included in a properly issued crosschecked certificate. With such detection, the client device can detect the possible intrusion by the malicious attacker and can shut down the establishment of the secure communications channel with the organization device.

Figure 1:
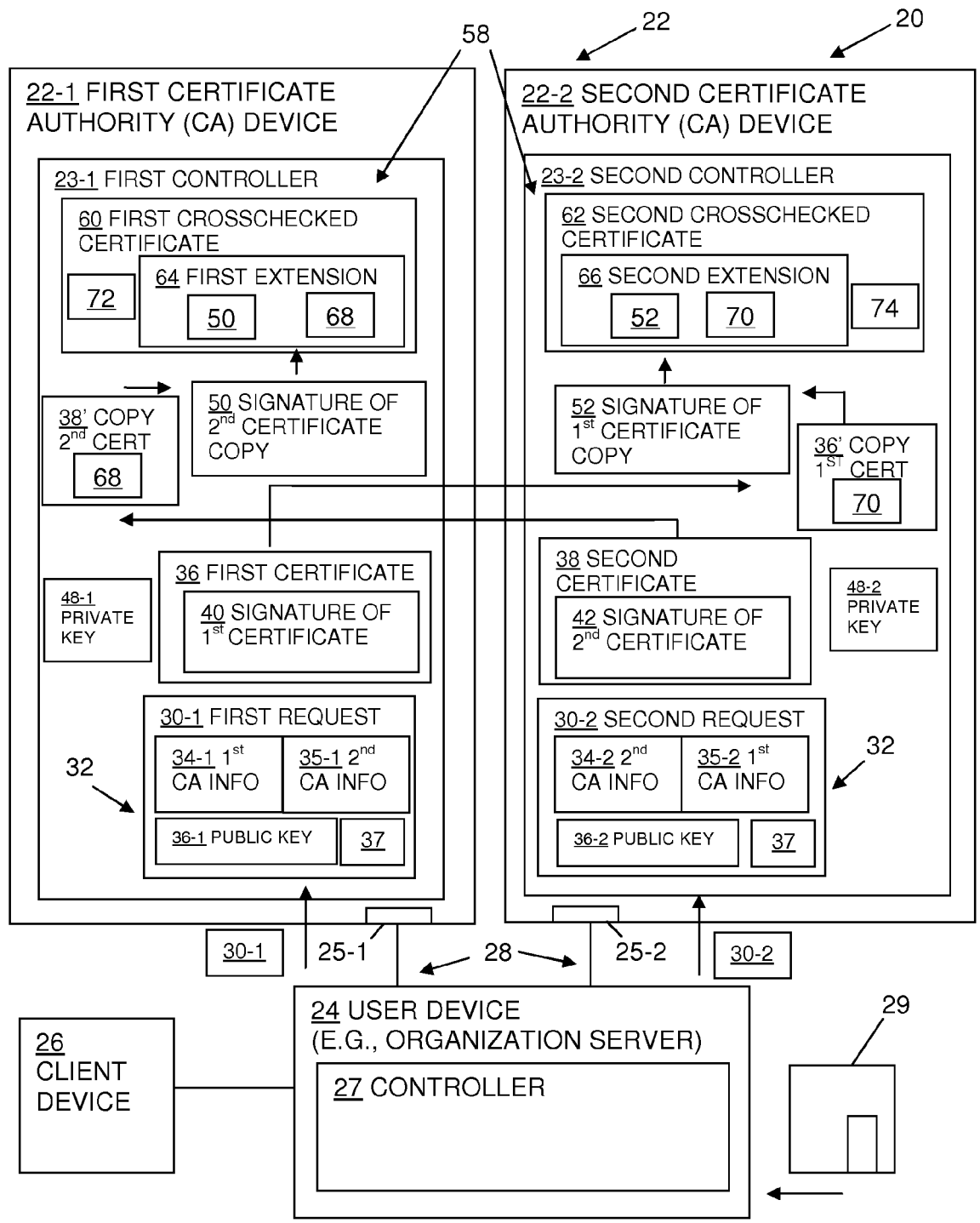
FIG. 1 illustrates a schematic representation of a certificate authority system including a user device and a set of certificate authority devices, according to one embodiment.

FIG. 1 illustrates schematic representation of an arrangement of a certificate authority system 20. As illustrated, the certificate authority system 20 includes a set of certificate authority devices 22 and a user device 24.

In the arrangement shown, the set of certificate authority (CA) devices 22 includes a first certificate authority device 22-1 and a second certificate authority device 22-2. Each of the first and second CA devices includes a controller 23, such as a memory and a processor. For example, the first CA device includes a first controller 23-1 while the second CA device includes a second controller 23-2. The controllers 23 of the respective CA devices 22 are configured to work in conjunction with each other to generate a set of crosschecked authentication certificates, termed crosschecked certificates herein, in response to requests provided by the user device 24. Each of the CA devices 22-1, 22-2 are disposed in electrical communication with the user device 24 via a corresponding communications interface 25-1, 25-2, respectively. For example, each CA device 22-1, 22-2 communicates with the user device 24 through a network connection 28, such as a wide area network (WAN) connection via the corresponding communication interfaces 25-1, 25-2.

The user device 24 includes a controller 27, such as a memory and a processor, configured to request and receive crosschecked certificates 60, 62 from the set of CA devices 22 in response to a request provided by the client device 26. For example, the user device 24 can be configured as an organization server, such as a server of a financial institution, which operates as the front end of an on-line commerce branch of the institution. With such a configuration, in order to interact securely with the user device 24, such as during an on-line transaction, a client device 26 can transmit a the request to establish a secured communication channel, such as a Transport Layer Security (TLS) or a Secure Sockets Layer (SSL) communication channel, with the user device 24 over a network as a WAN. In response to such a request, as part of the process to establish the secured communications channel through the network and as will be described in detail below, the user device 24 transmits requests to the set of certificate authority devices 22 to retrieve crosschecked certificates 60, 62.

In one arrangement, the controller 27 of the user device 24 stores a crosschecked certificate application. The crosschecked certificate application installs on the user device 24 from a computer program product 29. In some arrangements, the computer program product 29 is available in a standard off-the-shelf form such as a shrink wrap package (e.g., CD-ROMs, diskettes, tapes, flash drives, etc.). In other arrangements, the computer program product 29 is available in a different form, such downloadable online media. When performed on the controller 27 of the user device 24, the crosschecked certificate application causes the user device 24 to both request crosschecked certificates 60, 62 from the set of CA devices 22 and to validate the crosschecked certificates 60, 62 once received.

Figure 2:
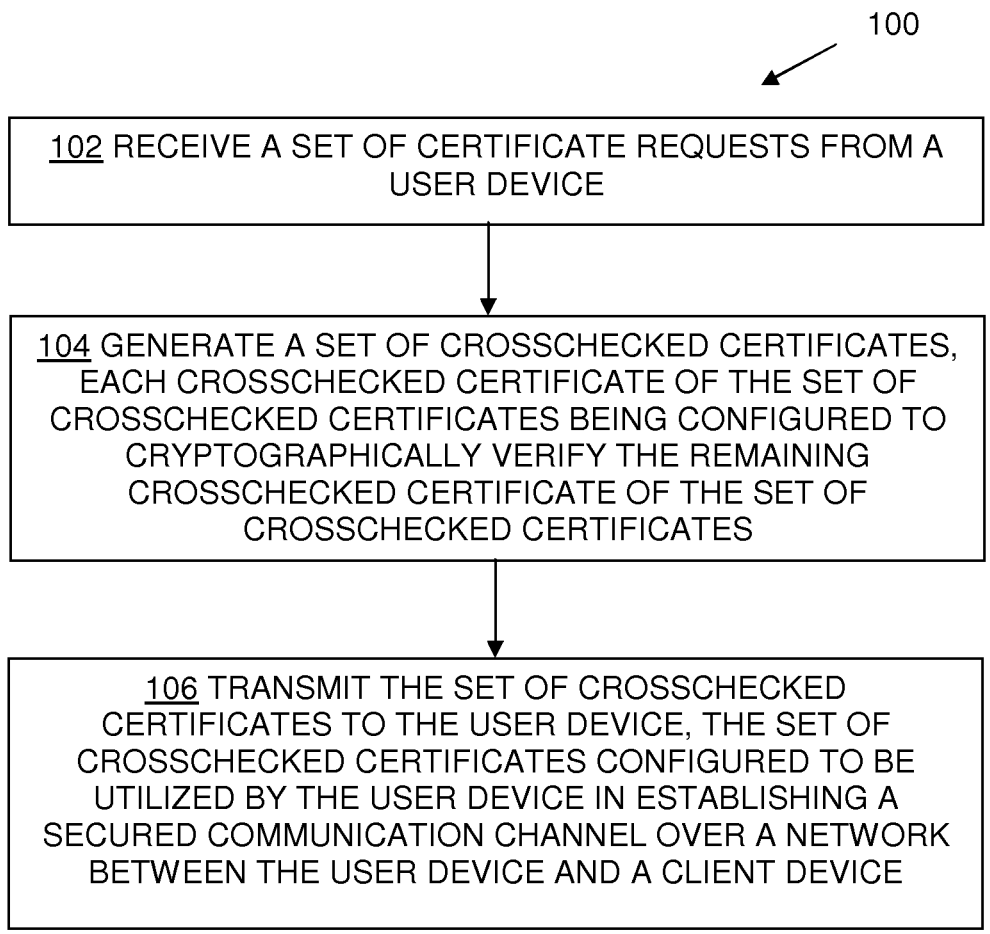
FIG. 2 is a flowchart that illustrates a procedure performed by the set of certificate authority devices of the certificate authority system of FIG. 1.

FIG. 2 illustrates a flowchart 100 showing a procedure performed by the set of certificate authority devices 22 of the certificate authority system 20 of FIG. 1.

In step 102, the set of certificate authority devices 22 receives a set of certificate requests 30 from a user device 24. In one arrangement, with reference to FIG. 1, assume the client device 26 transmits a request to establish a secured communication channel with the user device 24. In order to initiate the process of establishing the secured communications channel, the user device 24 creates a set of certificate requests 30 (e.g., crosschecked certificate requests) and transmits the certificate requests 30 to the set of certificate authority devices 22. For example, in the case where the set of certificate authority devices 22 includes the first and second CA devices 22-1, 22-2, the user device 24 generates a first and second certificate request 30-1, 30-2 for transmission to the CA devices 22-1, 22-2 via the WAN connection 28.

Each certificate request 30-1, 30-2 includes identification information 32 that identifies a destination certificate authority for the request 30-1, 30-2 as well as the corresponding certificate checking authority associated with the corresponding request 30-1, 30-2. For example, the first certificate request 30-1 includes a destination identifier 34-1 that identifies the first CA device 22-1 as the destination for the request 30-1 and includes a checking identifier 35-1 that identifies the second CA device 22-2 as the certificate checking authority associated with the request 30-1. Additionally, the second certificate request 30-2 includes a destination identifier 34-2 identifies the second CA device 22-2 as the destination for the request 30-2 and includes a checking identifier 35-2 that identifies the first CA device 22-1 as the certificate checking authority associated with the request 30-2. Accordingly, based upon the destination identifiers 34-1, 34-2 included in the requests 30-1, 30-2, the first CA device 22-1 receives the first certificate request 30-1 and the second CA device 22-2 receives the second certificate request 30-2.

While the identification information 32 can be configured in a variety of ways, in one arrangement, the identification information 32 (i.e., each of the destination identifiers 34-1, 34-2 and the checking identifier 35-1, 35-2) are configured as either the certificate-identifying information of the CA's root certificate, either the first CA device 22-1 or the second CA device 22-2, or a certificate used to verify the issued crosschecked certificate, 60 62. For example, each of the destination identifiers 34-1, 34-2 and the checking identifier 35-1, 35-2 can include as certificate-identifying information either the corresponding certificate-issuing CA device 22 serial number, or a corresponding subject key identifier (SKI).

While each certificate request 30-1, 30-2 includes identification information 32, the certificate requests 30-1, 30-2 can include other information utilized by the CA devices 22 when generating the crosschecked certificates 60, 62. For example, in one arrangement, each of the certificate requests 30-1, 30-2 includes a corresponding public key 36-1, 36-2 utilized by the associated CA device 22-1, 22-2 as part of a private-public key pair. While the private-public key pair can be configured in a variety of ways, in one arrangement, the public-private key-pair is configured as an RSA, Digital Signature Algorithm (DSA), Diffie-Hellman (DH) or EC key pair.

In the process of transmission of the certificate requests 30-1, 30-2, the user device 24 can transmit the requests 30-1, 30-2 to the first and second CA devices 22-1, 22-2 in a variety of formats. For example, the user device 24 can transmit the requests 30-1, 30-2 as part of a public-key cryptography standard format, such as a public-key cryptography standard (PKCS) #10 format or as part of a Certificate Request Message Format (CRMF) format. Additionally, in order to minimize the opportunity for a fraudster to compromise both the first and second certificate authorities 22-1, 22-2, in one arrangement the user device 24 is configured to transmit the requests 30-1, 30-2 at substantially the same time. Accordingly, the first and second CA devices 22-1, 22-2 can receive the respective requests 30-1, 30-2 at substantially the same times for processing of the requests 30-1, 30-2.

Returning to FIG. 2, in step 104, the set of certificate authority devices 22 generates a set of crosschecked certificates 58, each crosschecked certificate 60, 61, of the set of crosschecked certificates 58 being configured to cryptographically verify the remaining crosschecked certificate 60, 61 of the set of crosschecked certificates 58. For example, with reference to FIG. 1, the first and second CA devices operate in conjunction with each other to generate the crosschecked certificates 60, 62. While the crosschecked certificates 60, 62 can be generated in a variety of ways, an example of a process for the generation of crosschecked certificates 60, 62 is provided in detail below.

Initially, based upon the respective first and second crosschecked certificate requests 30-1, each of the first and second CA devices 22-1, 22-2 generates a corresponding certificate 36, 38, respectively. For example, based upon the public key 36-1 provided in the first certificate request 30-1, the first CA device 22-1 generates the first certificate 36 and based upon the public key 36-2 provided in the second certificate request 30-2 the second CA device 22-2 generates the second certificate 38. Next, each of the first and second CA devices 22-1, 22-2 sign the respective certificates 36, 38 with a digital signature. In the process of signing the certificates 36, 38, each of the first and second CA devices 22-1, 22-2 executes a signing algorithm to produce signatures based upon corresponding private keys. For example, the first CA device 22-1 utilizes a signing algorithm to generate a signature of the first certificate 40 using a first private key 48-1 while the second CA device 22-2 utilizes a signing algorithm the generate a signature of the second certificate 42 using a second a second private key 48-2.

Next, the first and second CA devices 22-1, 22-2 exchange copies of the signed certificates 36, 38. For example, based upon the checking identifier 35-1 received by the first CA device 22-1 as part of the first request 30-1, the first CA device 22-1 identifies the second CA device 22-2 as the checking authority for the certificates 36 generated by the first CA device 22-1. Accordingly, the first CA device 22-1 forwards a copy of the signed first certificate 36' to the second CA device 22-2. Furthermore, based upon the checking identifier 35-2 received by the second CA device 22-2 as part of the second request 30-2, the second CA device 22-2 identifies the first CA device 22-1 as the checking authority for the certificates 38 generated by the second CA device 22-2. Accordingly, the second CA device 22-1 forwards a copy of the signed second certificate 38' to the first CA device 22-1.

After receiving the copies of the signed certificates 36', 38', each of the first and second CA devices 22-1, 22-2 validates the signatures 40, 42 included with the signed certificates 36', 38'. In one arrangement, validation of each copy of the signed certificates 36', 38' is performed by chain verification on the certificate 36', 38' using the other CA's certificates. Taking the second CA device as an example, the second CA device 22-2 receives the first signed certificate 36' and a certificate chain associated with the first CA device 22-1. A root certificate of the second CA device 22-2 verifies either the first signed certificate 36' or one of the certificates in the certificate chain associated with the first CA device 22-1. In the case where the root certificate of the second CA device 22-2 only verifies one of the chain certificates in the certificate chain associated with the first CA device 22-1 then the chain certificate verifies the first signed certificate 36' or another chain certificate in the certificate chain associated with the first CA device 22-1 and so on. With such validation, the first and second CA devices 22-1, 22-2 verifies the authenticity of the signatures of the certificates 36', 38'.

Next, each respective CA device 22-1, 22-2 generates a respective crosscheck extension 64, 66 for inclusion in the correspondingly, and originally generated, certificates 36, 38 to create the crosschecked certificates 60, 62. For example, the first CA device 22-1 utilizes a signing algorithm in combination with the first private key 48-1 to generate a signature of the second certificate 50. The first certificate authority 22-1 combines the signature of the second certificate 50 and identity information 68 associated with the second certificate 38' to form a first crosschecked certificate 60. While the identity information 68 can be configured in a variety of ways, in one arrangement, the identity information 68 corresponds to the serial number of the second CA device 22-2 or to the subject key identifier (SKI) of the second CA device 22-2.

Additionally, the second CA device 22-2 utilizes a signing algorithm in combination with the second private key 48-2 to generate a signature of the first certificate 52. The second certificate authority 22-2 combines the signature of the first certificate 52 and identity information 70 associated with the first certificate 36' to form a second crosschecked certificate 62. While the identity information 70 can be configured in a variety of ways, in one arrangement, the identity information 70 corresponds to the serial number of the first CA device 22-1 or to the SKI of the first CA device 22-1.

Next, to provide the crosscheck extensions 64, 66 as being cryptographically verifiable, the first and second CA devices 22-1, 22-2 sign the crosschecked certificates 60, 62. For example, the first CA device 22-1 utilizes a signing algorithm in combination with the first private key 48-1 to generate a signature of the second certificate 50. Additionally, the second CA device 22-2 utilizes a signing algorithm in combination with the second private key 48-2 to generate a signature 72 of the first crosschecked certificates 60. Additionally, the second CA device 22-2 utilizes a signing algorithm in combination with the second private key 48-2 to generate a signature 74 of the second crosschecked certificate 62. With such validation, the first and second CA devices 22-1, 22-2 verifies the authenticity of the signatures of the crosschecked certificates 60, 62 and that the signatures of the crosschecked certificates 60, 62 have not been modified, such as by a fraudster.

Returning to FIG. 2, in step 106, the set of certificate authority devices 22 transmits the set of crosschecked certificates 58 to the user device 24, the set of crosschecked certificates 58 configured to be utilized by the user device 24 in establishing a secured communication channel over a network between the user device 24 and a client device 26. For example, with reference to FIG. 1, after having generated the crosschecked certificates 60, 62, the first and second CA devices 22-1, 22-2 forwards the crosschecked certificates 60, 62 to the requesting user device 24 via the network connection 28. Because each one of the crosschecked certificates 60, 62 verifies the authenticity of the corresponding certificate checking authority (e.g., the first crosschecked certificate 60 verifies the authenticity of the second CA device 22-2 and the second crosschecked certificate 62 verifies the authenticity of the first CA device, the crosschecked certificates 60, 62 minimize the likelihood of a malicious attacker creating a fraudulent certificate and infiltrating the secured channel between the user device 24 and the client device 26 without detection. For example, if the malicious attacker replaces one of the crosschecked certificates with a fraudulent certificate, during a validation process the client device 26 can detect the absence or invalidity of an extension, as is typically included in a properly issued crosschecked certificate.

Figure 3:
FIG. 3 is a flowchart that illustrates a procedure performed by the user device of the certificate authority system of FIG. 1.
Figure 4:
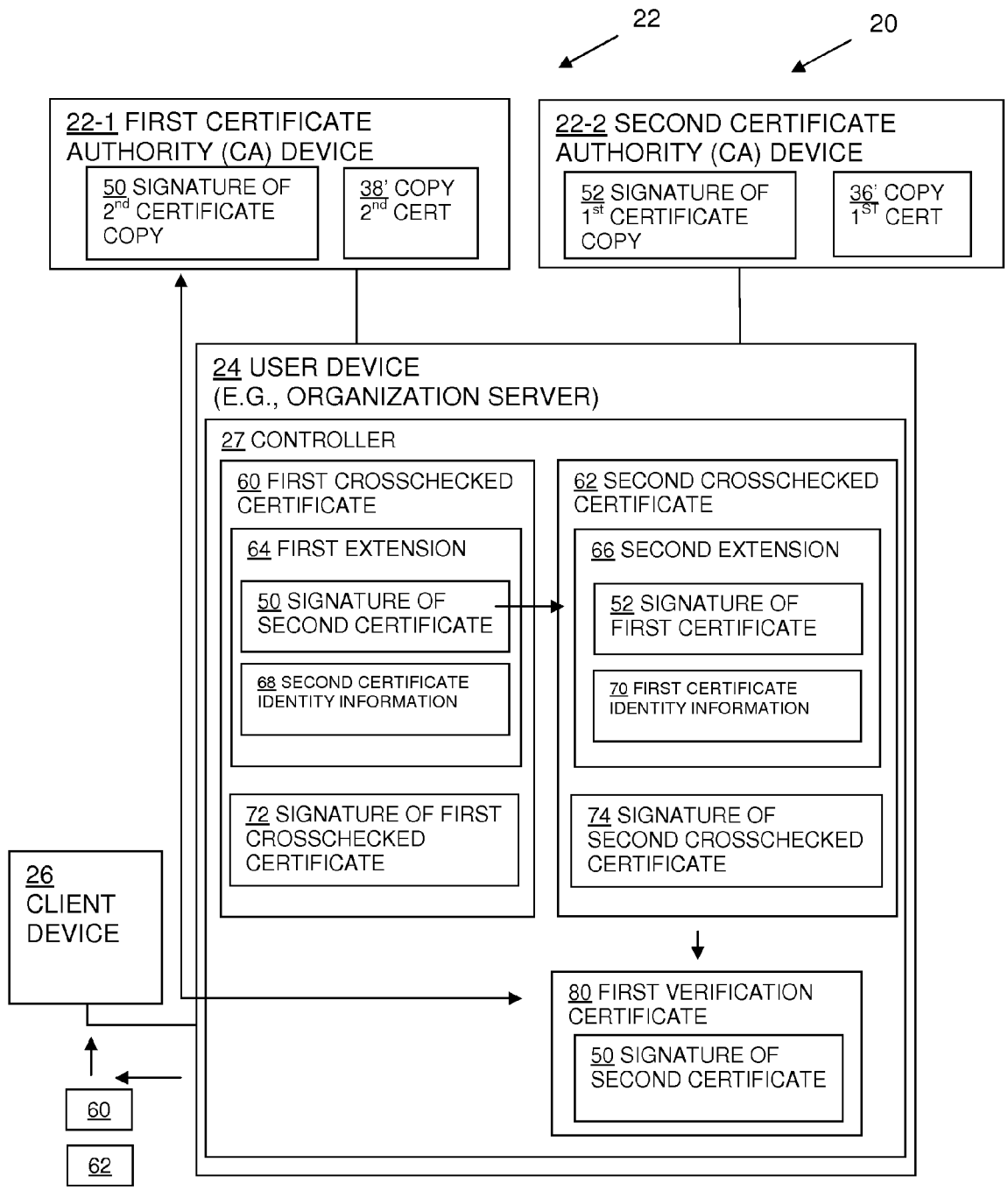
FIG. 4 illustrates a schematic representation of the organization device of FIG. 1, according to one embodiment.

In one arrangement, prior to forwarding the crosschecked certificates 60, 62 to the client device 26 to establish a secured communications channel, the user device 24 verifies the validity of the crosschecked certificates 60, 62 to ensure the integrity of the certificates 60, 62 as being received from the first and second CA devices 22-1, 22-2. FIG. 3 is a flowchart 200, taken in conjunction with FIG. 4, which illustrates a procedure performed by the user device of the certificate authority system of FIG. 1 when verifying the second crosschecked certificate 62.

In step 202, the user device 24 removes an extension 66 from the second crosschecked certificate 66, the extension including a signature of a first certificate 52 associated with the first certificate authority device 22-1 as generated by the second certificate authority device 22-2 and including identity information associated with the first certificate 70. Next, in step 204, the user device 24 select from the first crosschecked certificate 60 a signature of a second certificate 50 associated with the second certificate authority device 22-2 as generated by the first certificate authority device 22-1.

In step 206, the user device 24 inserts the signature of the second certificate 50, as associated with the second certificate authority device 22-2 and as generated by the first certificate authority device 22-1 into the second crosschecked certificate 62. Next, in step 208, the user device creates a first verification certificate 80 based upon the modified second crosschecked certificate 62. For example, the user device utilizes the CA device's 22-2 certificate chain to verify the signature of the second certificate 50. The user device 24 recodes the modified second crosschecked certificate 62 to adjust the size of length fields associated with the certificate 62. The resulting first verification certificate 50 includes the signature of the second certificate 50 as retrieved from the first crosschecked certificate.

In step 210, the user device 24 cryptographically verifies the first verification certificate 80 with a signature of the second certificate 50 associated with the second certificate authority device 22-2, as stored by the first certificate authority device 22-1. For example, as indicated above, as part of the crosschecked certificate generation process, the first CA device 22-1 utilizes a signing algorithm in combination with a private key 48-1 to generate a signature of the second certificate 50. The first CA device 22-1 includes this signature of the second certificate 50 as part of the first crosschecked certificate 60.

In the case where the first CA device 22-1 has transmitted the first crosschecked certificate 60 to the user device 24 and a fraudster has not infiltrated or modified the communication, the signature of the second certificate 50 as stored by the first CA device 22-1 should be identical to the signature of the second certificate 50 as included in the first crosschecked certificate. Accordingly, as indicated in step 212, the user device 24, in response to detecting a correspondence between the first verification certificate 80 and the signature of the second certificate 50 associated with the second certificate authority device 22-2, as stored by the first certificate authority device 22-1, validates the authenticity of the second crosschecked certificate 62. However, in the case where a fraudster has infiltrated or modified the first crosschecked certificate 60 as part of an attack, the signature of the second certificate 50 as stored by the first CA device 22-1 will not be identical to the signature of the second certificate 50 as included in the first crosschecked certificate. Accordingly, with such detection, rather than validate the authenticity of the second crosschecked certificate 62, the user device 24 can shut down the certificate exchange with the client device 26 to minimize compromise of pass codes or credentials sent from the client device 26.

In the case where the user device 24 validates the authenticity of the second crosschecked certificate 62, the user device then performs a similar process with respect to the first crosschecked certificate 60. In the event that the user device 24 validates both the first and second crosschecked certificates 60, 62 the user device 24 forwards the first and second crosschecked certificates 60, 62 for use in establishing a secured communications channel for exchange of sensitive information, such as pass codes or financial information. In one arrangement, when the client device 26 receives the first and second crosschecked certificates 60, 62, the client device 26 can, in turn, review the certificates 60, 62 to determine if the first and second crosschecked certificates 60, 62 are verified by a root certificate associated with the client device 26. By verifying the first and second crosschecked certificates 60, 62, the client device 26 can trust that the CA devices 22-1, 22-2 issuing the certificates 60, 62 were not compromised to issue the certificates.

While various embodiments of the invention have been particularly shown and described, it will be understood by those skilled in the art that various changes in form and details may be made therein without departing from the spirit and scope of the invention as defined by the appended claims.

For example, as described above, the certificate authority system 20 includes two distinct certificate authority devices 22—a first CA device 22-1 and a second CA device 22-2. Such description is by way of example only. In one arrangement, the certificate authority system 22 includes three or more certificate authority devices configured to generate crosschecked certificates.

As indicated above, the user device 24 utilizes the crosschecked certificates 60, 62 to establish a secure communications channel, such as a Transport Layer Security (TLS) or a Secure Sockets Layer (SSL) communication channel between the user device 24 and the client device 26. Such indication is by way of example only. In one arrangement, the user device 24 utilizes the crosschecked certificates 60, 62 for client authentication to establish a Secure Shell (SSH) or an Internet Protocol Security (IPsec) communication channel. In one arrangement, the user device 24 utilizes the crosschecked certificates 60, 62 as part of a key management scheme. In another arrangement, the user device 24 utilizes the crosschecked certificates 60, 62 as part of a public-key cryptography standard (PKCS) #7 format or as part of Cryptographic Message Syntax (CMS) where data is signed.

What is claimed is:

1. A method for generating a set of authentication certificates by a set of certificate authority devices, comprising:
   receiving, by the set of certificate authority devices, a set of certificate requests from a user device;
   generating, by the set of certificate authority devices, a set of crosschecked certificates, each crosschecked certificate of the set of crosschecked certificates being configured to cryptographically verify the remaining crosschecked certificate of the set of crosschecked certificates; and
   transmitting, by the set of certificate authority devices, the set of crosschecked certificates to the user device, the set of crosschecked certificates configured to be utilized by the user device in establishing a secured communication channel over a network between the user device and a client device;
   wherein receiving the set of certificate requests from the user device comprises receiving, by the set of certificate authority devices, the set of certificate requests from the user device, each certificate request of the set of certificate requests includes identification information that identifies a destination certificate authority device of the set of certificate authority devices for the certificate request and corresponding certificate checking authority device of the set of certificate authority devices,
   wherein receiving the set of certificate requests from the user device, each certificate request of the set of certificate requests including identification information comprises:
      receiving, by a first certificate authority of the set of certificate authorities, a first certificate request including identification information that identifies the first certificate authority as the destination certificate authority device for the first certificate request and that identifies the second certificate authority as the certificate checking authority; and
      receiving, by a second certificate authority of the set of certificate authorities, a second certificate request including identification information that identifies the second certificate authority as the destination certificate authority device for the second certificate request and identifies the first certificate authority as the certificate checking authority.

2. The method of claim 1, wherein receiving the set of certificate requests from the user device comprises receiving, by the set of certificate authority devices, the set of certificate requests from the user device at the same time.

3. The method of claim 1, wherein generating the set of crosschecked certificates comprises:
   signing, by the first certificate authority of the set of certificate authorities, a first certificate with a first private key in response to the first certificate request;
   forwarding, by the first certificate authority of the set of certificate authorities, a copy of the first certificate to the second certificate authority, the second certificate authority identified as the certificate checking authority in the first certificate request;
   signing, by the second certificate authority of the set of certificate authorities, a second certificate with a second private key in response to the second certificate request;
   forwarding, by the second certificate authority of the set of certificate authorities, a copy of the second certificate to the first certificate authority, the first certificate authority identified as the certificate checking authority in the second certificate request;
   generating, by the first certificate authority of the set of certificate authorities, a signature of the copy of the second certificate using the first private key;
   combining, by the first certificate authority of the set of certificate authorities, the signature of the copy of the second certificate and the first certificate to form a first crosschecked certificate of the set of crosschecked certificates;
   generating, by the second certificate authority of the set of certificate authorities, a signature of the copy of the first certificate using the second private key; and
   combining, by the second certificate authority of the set of certificate authorities, the signature of the copy of the first certificate and the second certificate to form a second crosschecked certificate of the set of crosschecked certificates.

4. The method of claim 3, further comprising:
combining, by the first certificate authority of the set of certificate authorities, identifying information of the copy of the second certificate with the signature of the copy of the second certificate and the first certificate to form the first crosschecked certificate of the set of crosschecked certificates; and
combining, by the second certificate authority of the set of certificate authorities, identifying information of the copy of the first certificate with the signature of the copy of the first certificate and the second certificate to form the second crosschecked certificate of the set of crosschecked certificates.

5. The method of claim 3, comprising:
signing, by the first certificate authority of the set of certificate authorities, the first crosschecked certificate of the set of crosschecked certificates with the first private key; and
signing, by the second certificate authority of the set of certificate authorities, the second crosschecked certificate of the set of crosschecked certificates with the second private key.

6. A set of certificate authority devices, each certificate authority device of the set of certificate authority devices comprising:
a communications interface; and
a controller disposed in electrical communication with the communications interface, the set of certificate authority devices configured to:
receive a set of certificate requests from a user device;
generate a set of crosschecked certificates, each crosschecked certificate of the set of crosschecked certificates being configured to cryptographically verify the remaining crosschecked certificate of the set of crosschecked certificates; and
transmit the set of crosschecked certificates to the user device, the set of crosschecked certificates configured to be utilized by the user device in establishing a secured communication channel over a network between the user device and a client device;
wherein when receiving the set of certificate requests from the user device, the set of certificate authority devices is configured to receive the set of certificate requests from the user device, each certificate request of the set of certificate requests includes identification information that identifies a destination certificate authority device of the set of certificate authority devices for the certificate request and corresponding certificate checking authority device of the set of certificate authority devices,
wherein when receiving the set of certificate requests from the user device, each certificate request of the set of certificate requests including identification information:
a first certificate authority of the set of certificate authorities is configured to receiving a first certificate request including identification information that identifies the first certificate authority as the destination certificate authority device for the first certificate request and that identifies the second certificate authority as the certificate checking authority; and
second certificate authority of the set of certificate authorities is configured to receive a second certificate request including identification information that identifies the second certificate authority as the destination certificate authority device for the second certificate request and identifies the first certificate authority as the certificate checking authority.

7. The set of certificate authority devices of claim 6, wherein when receiving the set of certificate requests from the user device, the set of certificate authority devices are configured to receive the set of certificate requests from the user device at the same time.

8. The set of certificate authority devices of claim 6, wherein when generating the set of crosschecked certificates:
the first certificate authority of the set of certificate authorities is configured to sign a first certificate with a first private key in response to the first certificate request;
the first certificate authority of the set of certificate authorities is configured to forward a copy of the first certificate to the second certificate authority, the second certificate authority identified as the certificate checking authority in the first certificate request;
the second certificate authority of the set of certificate authorities is configured to sign a second certificate with a second private key in response to the second certificate request;
the second certificate authority of the set of certificate authorities is configured to forward a copy of the second certificate to the first certificate authority, the first certificate authority identified as the certificate checking authority in the second certificate request;
the first certificate authority of the set of certificate authorities is configured to generate a signature of the copy of the second certificate using the first private key;
the first certificate authority of the set of certificate authorities is configured to combine the signature of the copy of the second certificate and the first certificate to form a first crosschecked certificate of the set of crosschecked certificates;
the second certificate authority of the set of certificate authorities is configured to generate a signature of the copy of the first certificate using the second private key; and
the second certificate authority of the set of certificate authorities is configured to generate a signature of the copy of the first certificate and the second certificate to form a second crosschecked certificate of the set of crosschecked certificates.

9. The set of certificate authority devices of claim 8, wherein:
the first certificate authority of the set of certificate authorities is configured to combine identifying information of the copy of the second certificate with the signature of the copy of the second certificate and the first certificate to form the first crosschecked certificate of the set of crosschecked certificates; and
the second certificate authority of the set of certificate authorities is configured to combine identifying information of the copy of the first certificate with the signature of the copy of the first certificate and the second certificate to form the second crosschecked certificate of the set of crosschecked certificates.

10. The set of certificate authority devices of claim 8, wherein:
the first certificate authority of the set of certificate authorities is configured to sign the first crosschecked certificate of the set of crosschecked certificates with the first private key; and
the second certificate authority of the set of certificate authorities is configured to sign the second crosschecked certificate of the set of crosschecked certificates with the second private key.

11. A method for providing a set of crosschecked authentication certificates to a client device, comprising:

transmitting, by a user device and at the same time, a first certificate request to a first certificate authority device of a set of certificate authority devices and a second certificate request to a second certificate authority device of the set of certificate authority devices;

receiving, by the user device, a first crosschecked certificate from the first certificate authority device and a second crosschecked certificate from the second certificate authority device;

verifying, by the user device, at least one of the first crosschecked certificate and the second crosschecked certificate; and transmitting, by the user device, the first cross-checked certificate and the second crosschecked certificate to the client device;

wherein verifying, at least one of the first crosschecked certificate and the second crosschecked certificate comprises:

removing, by the user device, an extension from the second crosschecked certificate, the extension including a signature of a first certificate associated with the first certificate authority device as generated by the second certificate authority device and including identity information associated with the first certificate;

selecting from the first crosschecked certificate, by the user device, a signature of a second certificate associated with the second certificate authority device as generated by the first certificate authority device;

inserting, by the user device, the signature of the second certificate associated with the second certificate authority device as generated by the first certificate authority device into the second crosschecked certificate;

creating, by the user device, a first verification certificate based upon the modified second crosschecked certificate;

cryptographically verifying, by the user device, the first verification certificate with a signature of the second certificate associated with the second certificate authority device, as stored by the first certificate authority device; and in response to detecting a correspondence between the first verification certificate and the signature of the second certificate associated with the second certificate authority device, as stored by the first certificate authority device, validating the authenticity of the second crosschecked certificate.

12. The method of claim 11, wherein verifying, at least one of the first crosschecked certificate and the second crosschecked certificate further comprises:

removing, by the user device, an extension from the first crosschecked certificate, the extension including a signature of a second certificate associated with the second certificate authority device as generated by the first certificate authority device and including identity information associated with the second certificate;

selecting from the first crosschecked certificate, by the user device, a signature of a first certificate associated with the first certificate authority device as generated by the second certificate authority device;

inserting, by the user device, the signature of the first certificate associated with the first certificate authority device as generated by the second certificate authority device into the first crosschecked certificate;

creating, by the user device, a second verification certificate based upon the modified first crosschecked certificate;

cryptographically verifying, by the user device, the second verification certificate with a signature of the first certificate associated with the first certificate authority device, as stored by the second certificate authority device; and in response to detecting a correspondence between the second verification certificate and the signature of the first certificate associated with the first certificate authority device, as stored by the second certificate authority device, validating, by the user device, the authenticity of the first crosschecked certificate.

13. A user device, comprising:

a communications interface; and a controller disposed in electrical communication with the communications interface, the controller configured to:

transmit, at the same time, a first certificate request to a first certificate authority device of a set of certificate authority devices and a second certificate request to a second certificate authority device of the set of certificate authority devices;

receive a first crosschecked certificate from the first certificate authority device and a second crosschecked certificate from the second certificate authority device;

verify at least one of the first crosschecked certificate and the second crosschecked certificate; and transmit the first cross-checked certificate and the second crosschecked certificate to the client device;

wherein when verifying at least one of the first crosschecked certificate and the second crosschecked certificate, the controller is configured to:

remove an extension from the second crosschecked certificate, the extension including a signature of a first certificate associated with the first certificate authority device as generated by the second certificate authority device and including identity information associated with the first certificate;

select from the first crosschecked certificate a signature of a second certificate associated with the second certificate authority device as generated by the first certificate authority device;

insert the signature of the second certificate associated with the second certificate authority device as generated by the first certificate authority device into the second crosschecked certificate;

create a first verification certificate based upon the modified second crosschecked certificate;

cryptographically verify the first verification certificate with a signature of the second certificate associated with the second certificate authority device, as stored by the first certificate authority device; and in response to detecting a correspondence between the first verification certificate and the signature of the second certificate associated with the second certificate authority device, as stored by the first certificate authority device, validate the authenticity of the second crosschecked certificate.

14. The user device of claim 13, wherein when verifying at least one of the first crosschecked certificate and the second crosschecked certificate, the controller is further configured to:

remove an extension from the first crosschecked certificate, the extension including a signature of a second certificate associated with the second certificate authority device as generated by the first certificate authority device and including identity information associated with the second certificate;

select from the first crosschecked certificate a signature of a first certificate associated with the first certificate authority device as generated by the second certificate authority device;

insert the signature of the first certificate associated with the first certificate authority device as generated by the second certificate authority device into the first crosschecked certificate;

create a second verification certificate based upon the modified first crosschecked certificate;

cryptographically verify the second verification certificate with a signature of the first certificate associated with the first certificate authority device, as stored by the second certificate authority device; and in response to detecting a correspondence between the second verification certificate and the signature of the first certificate associated with the first certificate authority device, as stored by the second certificate authority device, validate the authenticity of the first crosschecked certificate.

* * * * *